Sept. 23, 1941.  J. A. LUNDGREN  2,256,778
DECOY
Filed May 26, 1941
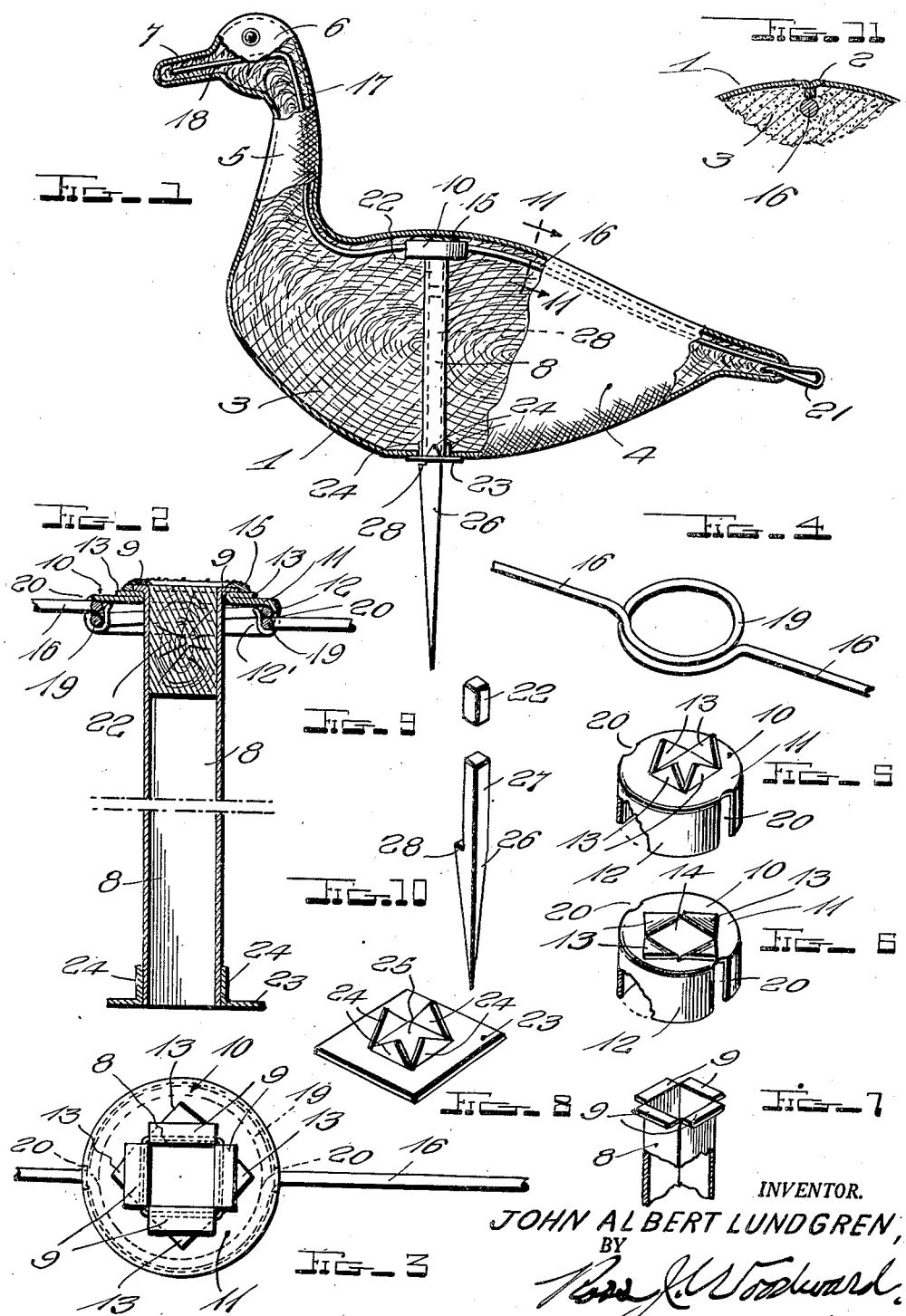
INVENTOR.
JOHN ALBERT LUNDGREN,
BY
ATTORNEY Patented Sept. 23, 1941

2,256,778

UNITED STATES PATENT OFFICE 2,256,778

DECOY

John A. Lundgren, Minden, Nebr.

Application May 26, 1941, Serial No. 395,257

6 Claims. (Cl. 43—3)

This invention relates to a decoy of the type used for attracting geese, ducks, and other wild birds which must be enticed close enough to be shot from a blind when hunting.

It is one object of the invention to provide a decoy which will closely resemble the birds to be attracted and serves very effectively to entice them close enough to be shot from a blind.

Another object of the invention is to provide a decoy having a stuffed body, neck and head reinforced by a member formed of wire and connected with the upper end of a strut which extends vertically in the body midway the length thereof and serves to reinforce the body as well as serving as a socket in which a supporting stake for the decoy is mounted.

Another object of the invention is to so form the strut that it will be firmly held in place and its upper end sealed to prevent water from entering the body through the strut and soaking the material with which the body is stuffed.

Another object of the invention is to provide a decoy which is of light weight, natural in appearance, and of sturdy construction.

The invention is illustrated in the accompanying drawing, wherein:

Fig. 1 is a view showing the decoy partially in section and partially in side elevation.

Fig. 2 is a sectional view on an enlarged scale taken vertically through the strut.

Fig. 3 is a top plan view of the strut.

Fig. 4 is a perspective view of the strut-engaging portion of the wire brace.

Fig. 5 is a perspective view of the cap cut to receive the strut.

Fig. 6 is a perspective view showing the tongues of Fig. 5 folded downwardly against the top of the cap.

Fig. 7 is a perspective view of the upper portion of the strut.

Fig. 8 is a perspective view of the plate at the lower end of the strut.

Fig. 9 is a perspective view of the plug for the upper end of the strut.

Fig. 10 is a perspective view of the support stake carried by the strut.

Fig. 11 is a fragmentary view on an enlarged scale, taken on the line 11—11 of Fig. 1.

This improved decoy has a body consisting of a casing 1 formed of canvas or other suitable fabric and having its meeting edge portions seamed to each other, as shown at 2 in Fig. 11. The casing is stuffed with a filler 3 which is formed into a compact mass under pressure, the filler and the casing being of the proper shape to provide the decoy with a body 4, a neck 5, and a head 6 from which projects a bill 7. The fabric from which the casing is formed is treated to render it waterproof and its outer surface is painted in accordance with the plumage of the bird to be simulated by the decoy.

A strut 8, which is formed of sheet metal and is of tubular formation, extends vertically in the body substantially midway the length thereof. This strut is rectangular in cross section, as shown in Figs. 3 and 7, and is cut from its upper end to provide its walls with outstanding flanges 9 serving as an abutment collar for the upper end of the strut. At the upper end of the strut is a head 10 formed of sheet metal and having an upper wall 11 and a depending marginal wall or flange 12. The upper wall 11 has tongues 13 struck from it, as shown in Fig. 5, and these tongues are folded downwardly flat against the top wall of the cap to reinforce the bead about an opening 14 formed centrally of the head. This opening conforms to the shape of the strut and is of such dimensions that when the strut is thrust downwardly through this opening, it will be snugly received therein, as shown in Fig. 2, with the flanges 9 of the strut resting on the tongues 13 where they are secured by solder 15. By so mounting the head 10 on the strut, it will be firmly held in place and prevented from sliding along the strut, the strut being likewise prevented from shifting longitudinally through the head when subjected to longitudinal strain.

A wire strand 16 serves to reinforce the body of the decoy, a portion 17 of the strand being bent upwardly to extend through the neck and having its upper end portion bent forwardly to form an arm 18 extending through the head 6 of the decoy and into the bill 7. Intermediate its length, the strand is coiled, as shown in Fig. 4, to provide a ring 19 which is of such dimensions that it will fit snugly within the cup-shaped head 10, where it is secured by bending lower portions of the flange or wall 12 inwardly and upwardly into clamping engagement with the ring or coil 19. Slots 20 are formed in the flange to receive portions of the strand 16 which extend forwardly and rearwardly from the ring at diametrically opposite points and, since the portions 12' of the flange or wall 12 are pressed very firmly into gripping engagement with convolutions of the ring or coil, the reinforcing wire strand will be held in place and extend longitudinally of the body along the back thereof. The rear end portion of the strand is folded back upon itself and forms an eye or loop 21 which projects outwardly from the rear end of the body 4 of the decoy and constitutes a hanger by means of which the decoy may be suspended from a hook, nail, or other suitable overhead support. A plug 22, which is formed of wood, is fitted into the upper end of the strut, and since this plug fits tightly into the strut, it will serve very effectively to prevent water from flowing through the tube and soaking the filler 3 with which the casing is stuffed.

Referring to Fig. 1, it will be seen that the lower end of the strut passes through the lower portion of the casing 1 and carries a bottom plate 23 which fits tightly about the strut and is formed with tongues 24 which extend upwardly along side walls of the strut. These tongues are cut from the central portion of the bottom plate and when bent upwardly, form an opening 25 to receive the strut. The tongues may be soldered to the strut or frictional grip depended upon to hold the plate in place about the lower end of the strut.

When the decoy is in use, it is to be set up in marshy land in a position naturally assumed by wild geese or other birds which the decoy is intended to simulate. In order to so support the decoy, there has been provided a stake 26 which is tapered to a point at its lower end, in order that the stake may be easily thrust into the ground. The upper portion of the stake is of reduced thickness to provide a shank 27 which conforms to the cross sectional shape of the strut and fits snugly therein. A shoulder 28 at the lower end of the shank limits movement of the shank upwardly into the strut and constitutes a support upon which the strut rests when the stake is applied and thrust into the ground to support the decoy. Any water which may enter the strut will be confined therein by the plug 22 and prevented from reaching the filling 3. Therefore, the filling will not become soaked and soggy. When the decoys are removed from the positions in which they have been placed for use, the stakes are withdrawn from the struts and put away and the decoys hung up by the loops 21 so that they will be thoroughly dried.

Having thus described the invention, what is claimed is:

1. A decoy comprising a body having a neck and a head, a strand extending longitudinally in the body along the back thereof with a portion bent to extend through the neck and the head, a tubular strut extending vertically in the body intermediate the length thereof and having its upper end connected with said strand and its lower end open and exposed through the bottom of the body, and a supporting stake having its upper portion removably received in the strut through the open lower end thereof, said stake being provided with a shoulder for engaging the strut and limiting movement of the stake into the strut.

2. A decoy comprising a body having a casing and a filler, the body being formed with a neck and a head carried by the neck, a strand extending longitudinally through the body along the back thereof and having its forward portion bent to extend through the neck and the head, the rear portion of the strand being bent to form a loop projecting from the rear end of the body, a hollow strut disposed vertically in the body substantially midway the length thereof and having its upper end connected with the strand, said strut having its lower end open and exposed through the bottom of the body, and a support having a portion removably received in the strut through the open lower end thereof.

3. A decoy comprising a body having a casing and a filler, the body being formed with a neck and a head carried by the neck a strand extending longitudinally through the body along the back thereof and having its forward portion bent to extend through the neck and the head, an intermediate portion of the strand being bent to form a ring, a hollow strut disposed vertically in the body and having its upper end connected with said ring, the lower end of the strut being open and exposed through the bottom of the body, and a stake having its upper portion removably received in the strut through the open lower end thereof.

4. A decoy comprising a body having a casing and a filler, the body being formed with a neck and a head carried by the neck, a strand extending longitudinally through the body along the back thereof and having its forward portion bent to extend through the neck and the head, an intermediate portion of the strand being bent to form a ring, a hollow strut disposed vertically in the body and having its upper end connected with said ring and its lower end open and exposed through the bottom of the body, a collar fitting about the upper portion of said strut and having an upper wall formed with a strut-receiving opening and a depending wall formed with slots receiving portions of the strand in front of and back of the ring, said depending wall being bent inwardly and upwardly into gripping engagement with the ring, the upper end of the strut being fixed to the upper wall of said collar, and a stake having its upper portion removably received in the strut through the open lower end thereof.

5. A decoy comprising a body having a casing and a filler, the body being formed with a neck and a head carried by the neck, a strand extending longitudinally through the body along the back thereof and having its forward portion bent to extend through the neck and the head, an intermediate portion of the strand being bent to form a ring, a hollow strut disposed vertically in the body and having its lower end open and exposed through the bottom of the body, a collar fitting about the upper portion of said strut and having an upper wall formed with a strut-receiving opening and a depending wall formed with slots receiving portions of the strand in front of and back of the ring, the opening in the upper wall being formed by tongues cut therefrom and bent flat against the outer face of the wall about the opening, flanges at the upper end of the strut projecting laterally therefrom and secured flat against the tongues of the collar, and a stake having its upper portion removably received in the strut through the open lower end thereof.

6. A decoy comprising a body having a casing and a filler, the body being formed with a neck and a head carried by the neck, a strand extending longitudinally through the body along the back thereof and having its forward portion bent to extend through the neck and the head, an intermediate portion of the strand being bent to form a ring, a hollow strut disposed vertically in the body and having its lower end open and exposed through the bottom of the body, a collar fitting about the upper portion of said strut and having an upper wall formed with a strut-receiving opening and a depending wall formed with slots receiving portions of the strand in front of and back of the ring, the opening in the upper wall being formed by tongues cut therefrom and bent flat against the outer face of the wall about the opening, flanges at the upper end of the strut projecting laterally therefrom and secured flat against the tongues of the collar, a plug filling the upper end of said strut and constituting an upper closure therefor, a bottom plate disposed against the under face of the body and formed with an opening receiving the lower end of the strut and bordered by upstanding tongues engaging outer surfaces of walls of the strut, and a stake having a tapered lower portion, the upper portion of the stake being removably received in the strut through the open lower end thereof and provided with a shoulder adjacent the under face of the bottom plate to limit movement of the stake into the strut.

JOHN A. LUNDGREN.